(12) United States Patent
Drucker et al.

(10) Patent No.: US 6,937,870 B2
(45) Date of Patent: Aug. 30, 2005

(54) WIRELESS INTERACTIVE TRANSACTION SYSTEM

(76) Inventors: Elliott H. Drucker, 12124 NE. 144th St., Kirkland, WA (US) 98034; Douglas C. Fleming, 93 Mayfair Dr., San Francisco, CA (US) 94418; Martin Zivin, P.O. Box 95687, Hoffman Estates, IL (US) 60195

( * ) Notice: Subject to any disclaimer, the term of this patent is extended or adjusted under 35 U.S.C. 154(b) by 483 days.

(21) Appl. No.: 09/970,614

(22) Filed: Oct. 4, 2001

(65) Prior Publication Data

US 2003/0069006 A1 Apr. 10, 2003

(51) Int. Cl.$^7$ .............................................. H04Q 7/20
(52) U.S. Cl. ................ 455/466; 455/186.1; 455/456.5; 455/456; 455/557; 455/558; 455/2.01; 455/3.04; 725/9; 725/24
(58) Field of Search ................................ 455/466, 456, 455/456.1, 2.01, 3.02, 3.04, 462, 415, 566, 553, 418, 419, 550.1, 3.05, 3.06, 414.1, 11.1, 66.1, 67.11, 65.1, 569.1; 725/9, 24

(56) References Cited

U.S. PATENT DOCUMENTS

| | | | |
|---|---|---|---|
| 4,718,106 A | | 1/1988 | Weinblatt .......................... 455/2 |
| 5,297,191 A | | 3/1994 | Gerszberg ....................... 379/59 |
| 5,303,393 A | * | 4/1994 | Noreen et al. .............. 455/3.02 |
| 5,485,505 A | | 1/1996 | Norman et al. ................ 379/58 |
| 5,585,858 A | * | 12/1996 | Harper et al. ................ 348/485 |
| 5,930,703 A | | 7/1999 | Cairns .......................... 455/418 |
| 6,246,672 B1 | * | 6/2001 | Lumelsky ..................... 370/310 |
| 6,704,864 B1 | * | 3/2004 | Philyaw .......................... 713/1 |
| 2003/0054842 A1 | * | 3/2003 | Riedl et al. .................. 455/462 |
| 2003/0069032 A1 | * | 4/2003 | Jarvi et al. ................... 455/466 |

OTHER PUBLICATIONS

Printout from Digital: Convergence website 2 pages http://www.crq.com/master_templ.cfm?view=products&products=CueTv.

* cited by examiner

Primary Examiner—Emmanuel L. Moise
Assistant Examiner—Julio Perez
(74) Attorney, Agent, or Firm—Jensen & Puntigam PS

(57) ABSTRACT

A method and system for enabling automatic or semi-automatic interactive responses to electronic queries using audio-band coded data as the query medium and wireless data communications as the response medium. Typical applications include interactive broadcast advertising in which a coded data query is embedded in a broadcast audio channel and reproduced as an acoustic audio signal in a broadcast receiver. This acoustic signal is then detected by the microphone of a wireless telephone and decoded and processed by the electronic circuitry of said wireless telephone. Upon a pre-determined further action by the user, the decoded and processed query data causes the wireless telephone to transmit a pre-determined message. The pre-determined message includes information which instructs the serving wireless network to properly route the message so that it effectively provides a response to the original query.

32 Claims, 5 Drawing Sheets

WIRELESS INTERACTIVE TRANSACTION SYSTEM

BACKGROUND OF THE INVENTION

The present invention provides a system for enabling semi-automatic or automatic responses to various types of electronic queries posed in the form of a coded digital signal. As used herein the term "automatic" means without human intervention and the term "semi-automatic" means upon a simple enabling action by a human user.

A large number of commercial and public enterprises may find desirable to elicit responses to queries that can be reduced through standardization to brief digital messages. However, the prototypical application for this capability is in the area of "interactive broadcast advertising", which can be described as follows.

Advertisement on broadcast media is a well established process. As used herein, the term "broadcast" shall include radio and television using electromagnetic radiation, cable, and/or fiber optic transport as transmission media, and intended for reception by a large audience. Typically, advertisers pay a fee for their advertisements to be broadcast in the hope that listeners/viewers will take certain actions, such as the purchase of a product, to the benefit of the advertiser. It is a well established principle within the advertising industry that the effectiveness of a broadcast advertisement (i.e. the percentage of listeners/viewers that subsequently take the desired action) would be substantially improved if a way existed for such action to be taken, or at least initiated, as an immediate and simple response by the listener/viewer. A system that includes such response means is generally referred to within the broadcast and advertising industries as "interactive broadcast advertising".

Various methods have been proposed to enable interactive broadcast advertising with limited success. For example, experiments have been conducted within cable television systems wherein the cable transmission system includes a channel in the "uplink" direction to be used for viewer responses. These responses are further enabled by a special electronic apparatus associated with the viewer's cable connection, which apparatus provides simple means to allow the viewer to indicate a response to a prompt included in received television content, and further provides means to relate the response to that prompt, and further provides means to digitally convey the identification of the prompt and the viewer response on the uplink cable channel. This prior art method is deficient in that it requires costly changes to the cable television network and deployment of specialized response devices in the viewers' premises, and that it is restricted in application to cable television advertising, to the exclusion of other forms of broadcast advertising.

Based upon performance and user acceptance of previously proposed methods for enabling interactive broadcast advertisement, it is generally accepted that an improved method would need to be universally adaptable to all forms of broadcast advertising, would utilize infrastructure already in place, and would require only those enabling devices already in widespread use.

Wireless telephone networks are now well established in most countries of the world. Furthermore, in most industrialized countries a significant percentage of the population possesses a compatible wireless device, typically a wireless telephone handset or cellular telephone, herein collectively called a Wireless Telephone Handset. In recent years, this already significant percentage, generally referred to as "penetration rate" has been growing steadily, to the point that individual access to a Wireless Telephone Handset may be considered to be generally ubiquitous, either presently or in the foreseeable future. Recently, many operators of wireless telephone networks have equipped their networks with various means for conveyance of short data messages to and from suitably enabled wireless telephone handsets. Many of the wireless telephone handsets in use today are so enabled, and this percentage can be expected to grow rapidly as users frequently replace their handsets with upgraded models to take advantage of new features. This short data message capability sets wireless telephone networks apart from conventional wireline networks in which a dial-up connection to a data server must generally be established before data communications can be transported.

The general ubiquity of wireless telephone handsets and the availability of short data message conveyance within wireless networks suggests that such wireless data services would provide an ideal medium for the responses associated with interactive broadcast advertisement.

OBJECTS AND SUMMARY OF THE INVENTION

An object of the present invention is to provide a system for automatically or semi-automatically conveying, via a transport that includes wireless telecommunications networks, responses to various types of digitally coded electronic queries ("Digitally Coded Queries").

Another object of the present invention is to provide a system by which said Digitally Coded Queries can be conveyed to wireless devices such as cellular telephone handsets.

These and other objects of the invention are attained by a system which includes a standardized format for the digitally coding query, a method for formatting the Digitally Coded Query as an audio-band electronic signal, the modulation of this audio-band electronic signal within the audio channel of a broadcast medium, the subsequent reproduction of the audio-band electronic signal as an acoustic signal by an appropriately tuned conventional broadcast receiving device, the detection of the acoustic signal by the microphone of a nearby Wireless Telephone Handset, the decoding of the original Digitally Coded Query from the acoustic signal by circuitry within the Wireless Telephone Handset, internal electronic processing within the Wireless Telephone Handset whereby it configures itself so as to transmit one of several specific digital messages, hereinafter called Response Messages, based upon (a) instructions contained within the Digitally Coded Query and (b) subsequent actions by the human user, the conveyance of the transmitted Response Message by conventional means through the Serving Wireless Network to a message routing device, and the further conveyance of the transmitted Response Message by conventional means to a computer system which receives and processes the transmitted Response Message in an appropriate manner. There is essentially no limit as to the nature of the original query or the significance of possible responses.

A second system is described in which the Wireless Telephone Handset automatically transmits the Response Message without the requirement of a specific user action.

A third system is described in which the transmitted Response Message, as described in the first system, takes the form of a telephone call origination rather than an uplink data message within the wireless network.

A fourth system is described which additionally provides an electronic connection between the broadcast receiving device and the Wireless Telephone Handset so as to convey the Digitally Coded Query in the form of an audio-band electronic signal rather than an acoustic signal.

A fifth system is described which provides for generation of an acoustic signal and/or an audio-band electronic signal, as described in the first and fourth systems, by a device other than a broadcast receiving device, thereby enabling generation of Digitally Coded Queries and formation and conveyance of automatic and/or semi-automatic responses in support of a wide range of applications unrelated to broadcast media.

DETAILED DESCRIPTION OF THE INVENTION

Figure 1A:
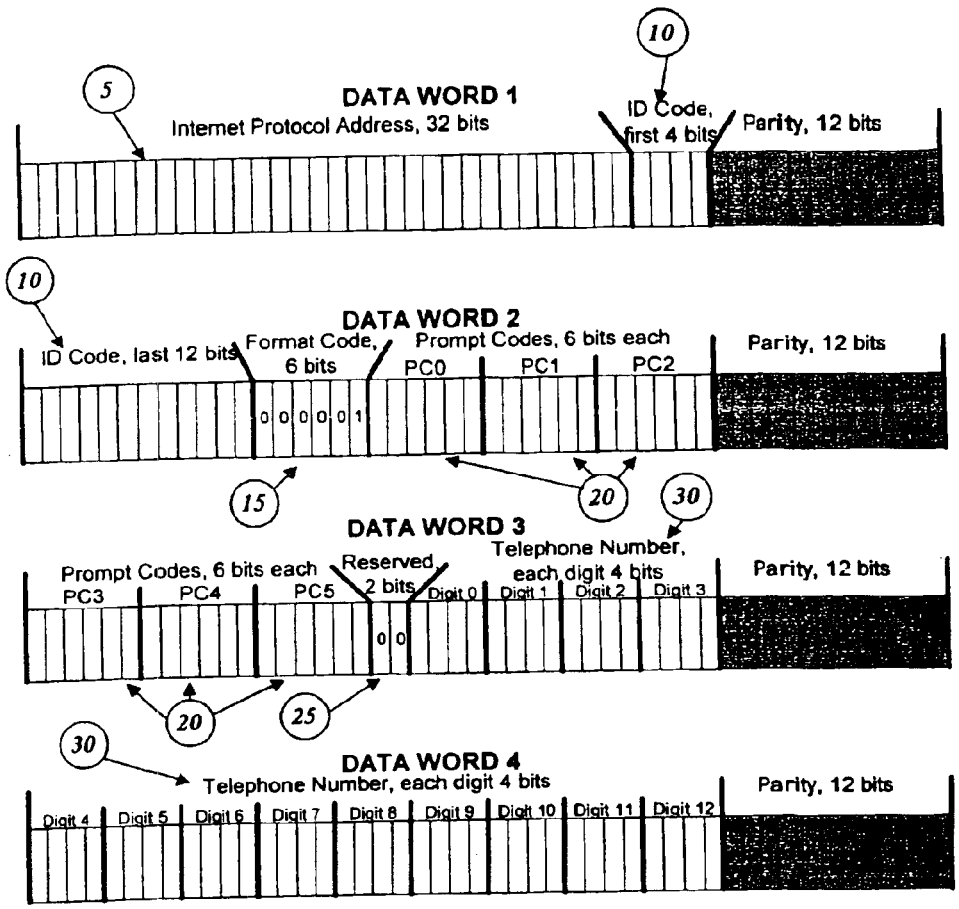
FIGS. 1A and 1B show the data mapping and transmission sequence used for the Digitally Coded Query of the preferred embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

While one can appreciate that the invention could function as intended using a wide range of different formats for the Digitally Coded Query, practical application of the invention will require that this format be standardized. The preferred embodiment of the invention uses the formats shown in FIGS. 1A and 1B. The mapping of specific included data is shown in FIG. 1A and the sequence of data transmission is shown in FIG. 1B.

Figure 1B:
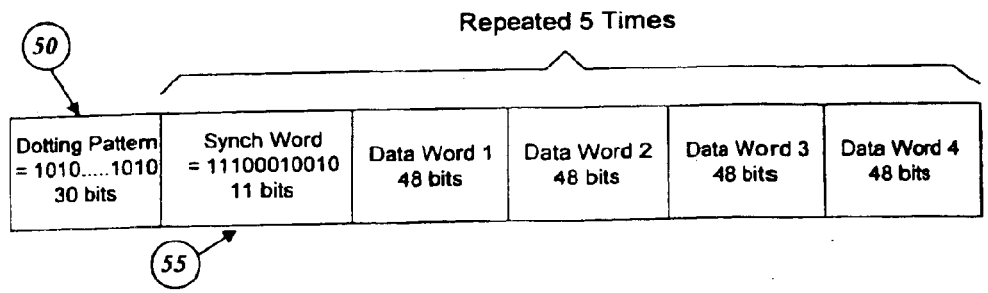

Turning now to FIG. 1A, the Digitally Coded Query is divided into four data words each of which is 48 bits long and includes 36 data bits followed by 12 parity bits. Each data word is formed by encoding the 36 data bits into a (48, 36) Bose-Chaudhuri-Hocquenghem Code (BCH Code) with minimum distance 5, using the generator polynomial $$G_b(x)=x^{12}+x^{10}+x^8+x^5+x^4+x^3+x^0.$$

The code, a shortened version of the primitive (63, 51, 5) BCH Code, is a systematic linear block code with the first (earliest transmitted) bit as the most significant data bit and the last (latest transmitted) bit as the last parity-check bit. The logical processes involved in executing this coding are well known to those skilled in the art.

In this example, the first 32 data bits of Data Word 1 contain an Internet Protocol Address (IP Address) 5 which corresponds to the destination address for data messages sent in response to the Digitally Coded Query. The last 4 data bits of Data Word 1 and the first 12 bits of Data Word 2 collectively comprise the Identification Code (ID Code) 10. The ID code, in combination with the IP address, uniquely identifies the Digitally Coded Query and is included in data messages sent by the Wireless Telephone Handset in response.

The 6-bit Format Code 15 in Data Word 2 is used to specify the layout of the remaining data bits in Data Word 2 and the data bits in Data Words 3 and 4. This use of the Format Code allows for standardized definition of 64 different data layouts depending upon the types of data that might need to be conveyed within the Digitally Coded Query. In the preferred embodiment of the invention, the data layout as shown in FIG. 1A, and a further indication that a human user action is to be required to initiate a response, will be generally useful for Digitally Coded Queries associates with interactive broadcast advertising. This format will be specified by Format Code=000001 (binary).

The Digitally Coded Query in the preferred embodiment of the invention includes six 6-bit Prompt Codes 20 residing in the last 18 data bits of Data Word 2 and the first 18 data bits of Data Word 3. The Prompt Codes, specified as PC0 through PC5, each define one of 32 possible specific prompts that might be provided to the user, and which would then correspond to six possible unique response actions that might be taken by the user. The library of the 32 possible prompts is standardized so that the mobile telephone handset receiving the Digitally Coded Query will provide the intended prompts associated with each possible responding user action.

The 2-bit Reserved data field 25 in Data Word 3 provides means for specifying features to be determined in the future. In the preferred embodiment of the invention this field is set to 00 (binary).

In the preferred embodiment of the invention, the last 16 bits of Data Word 3 and the 36 bits of Data Word 4 provide encoding of a Response Telephone Number 30 of up to 13 digits length. Placing a call to the Response Telephone Number is one of the possible actions that the Wireless Telephone Handset may take in response to the Digitally Coded Query. Each digit of the Response Telephone Number, which may be a standard telephone digit 0–9, '*', or '#', is coded as a 4-bit binary value using the following coding:

| Telephone Digit | Binary Value |
| --- | --- |
| 1 | 0001 |
| 2 | 0010 |
| 3 | 0011 |
| 4 | 0110 |
| 5 | 0101 |
| 6 | 0110 |
| 7 | 0111 |
| 8 | 1000 |
| 9 | 1001 |
| 0 | 1010 |
| * | 1011 |
| # | 1100 |
| null | 0000 |

Digit 0 corresponds to the first digit of the telephone number, Digit 1 corresponds to the second digit, and so forth. If the telephone number is shorter than 13 digits, "unused" trailing digits are coded as 0000 binary (null).

Turning now to FIG. 1B, the transmission sequence of the digitally Coded Query in the preferred embodiment of the invention begins with a 30-bit dotting pattern 50 followed by five concatenated transmissions of the 11-bit Synch Word 55 and Data Words 1–4. The sequence of the Digitally Coded Query transmission thus consists of a total of 1,045 bits. The dotting pattern 50 at the beginning of the sequence allows for the Wireless Telephone Handset 180 to detect the imminent presence of a Digitally Coded Query. The Synch Word provides a known data pattern that allows the Wireless Telephone Handset to (a) synchronize to the end of the dotting pattern and the beginning of the first repeat of Data Words, and (b) confirm or re-acquire synchronization at the beginning of subsequent repeats of Data Words.

Figure 2:
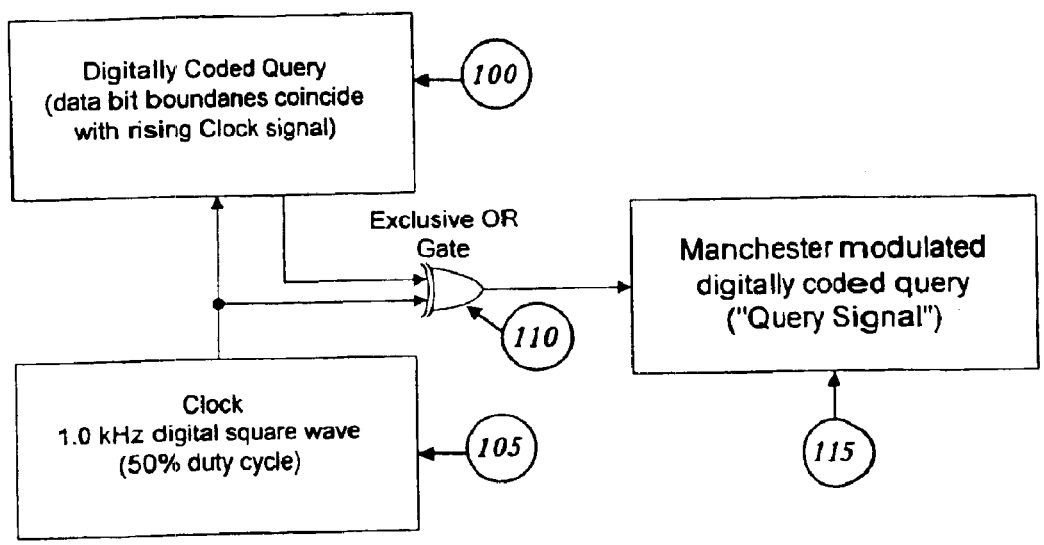
FIG. 2 is a schematic block diagram of the Manchester modulator used for modulating the Digitally Coded Query of the present invention into an audio-band signal.

FIG. 2 shows the method employed in the preferred embodiment of the invention for converting the Digitally Coded Query into an audio-band signal. One can readily appreciate that any number of different schemes could be employed in achieving this conversion. The Digitally Coded Query is modulated into an audio band phase-shift keyed signal using Manchester modulation. The digital binary bits of the Digitally Coded Query 100 are sequentially clocked by the leading edge (0 to 1 transition) of a 1.000 kHz, 50% duty cycle Clock signal 105, and are combined with the Clock signal in a logical Exclusive OR gate 110. The output of the Exclusive OR gate 110 is a Manchester Modulation of the Digitally Coded Query, hereinafter called the Query Signal 115, and is an audio-band phase shift keyed signal in which a 0 to 1 phase transition in the middle of the bit period corresponds to a logical 1 bit and a 1 to 0 phase transition in the middle of the bit period corresponds to a logical 0 bit. Phase transitions occurring at bit boundaries carry no information.

Figure 3:
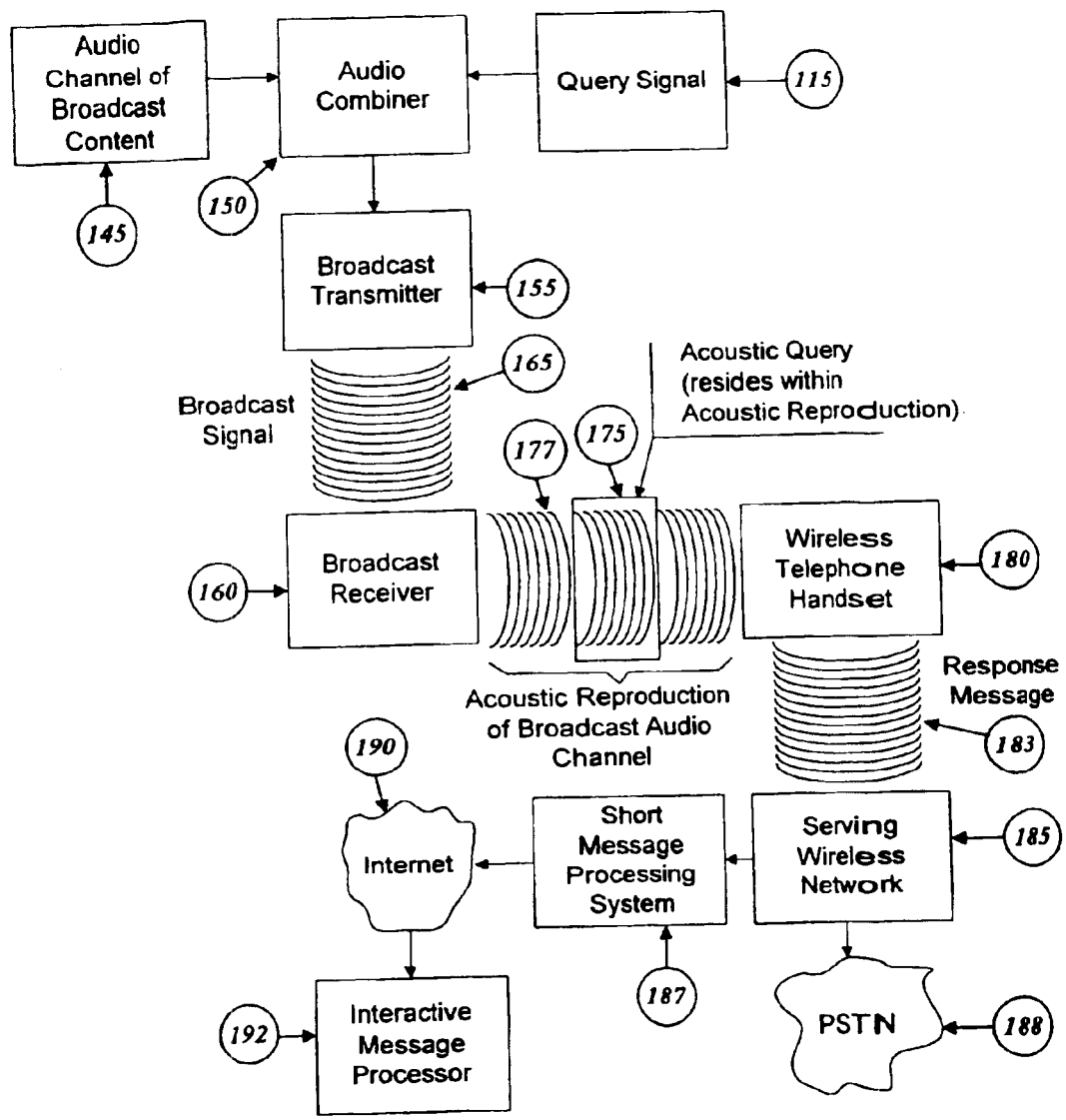
FIG. 3 is a schematic block diagram of the first, second, and third systems of the invention.

As shown in FIG. 3 the Query Signal 115 is injected into the audio channel of the broadcast content 145 by using an audio combiner 150. Electronic circuitry or other means which effects this function are well known to those skilled in the art.

The audio channel containing the Query Signal output by the audio combiner 150 is transmitted by the broadcast transmitter 155 using a conventional apparatus well known to those skilled in the art. In some cases, conveyance of the audio channel to the broadcast transmitter may involve transmission over various electronic media and/or intermediate recording and subsequent playback. In these cases, in the preferred embodiment of the invention, such signal conveyance, recording, and/or playback must use techniques which will not appreciably distort the frequency or phase of the included Query Signal. Such non-distorting transmission and recording/playback techniques are well known to those skilled in the art.

The broadcast signal 165 generated by the broadcast transmitter is conveyed to the Broadcast Receiver 160 by conventional transport means, which may include electromagnetic radiation, cable transmission, fiber optic transmission, or any combination thereof. Such conventional transport involves well established technologies.

The Broadcast Receiver 160 is any of several types of conventional electronic devices in widespread use and utilizing well established technologies. If the Broadcast Receiver 160 is tuned so as to receive a broadcast transmission containing a Query Signal it will, in the course of its normal function, reproduce the Query Signal in the form of an acoustic signal, herein called the Acoustic Query 175.

The Acoustic Query 175 will then reside within the acoustic reproduction of the broadcast audio channel 177 intended for human listening.

Figure 6:
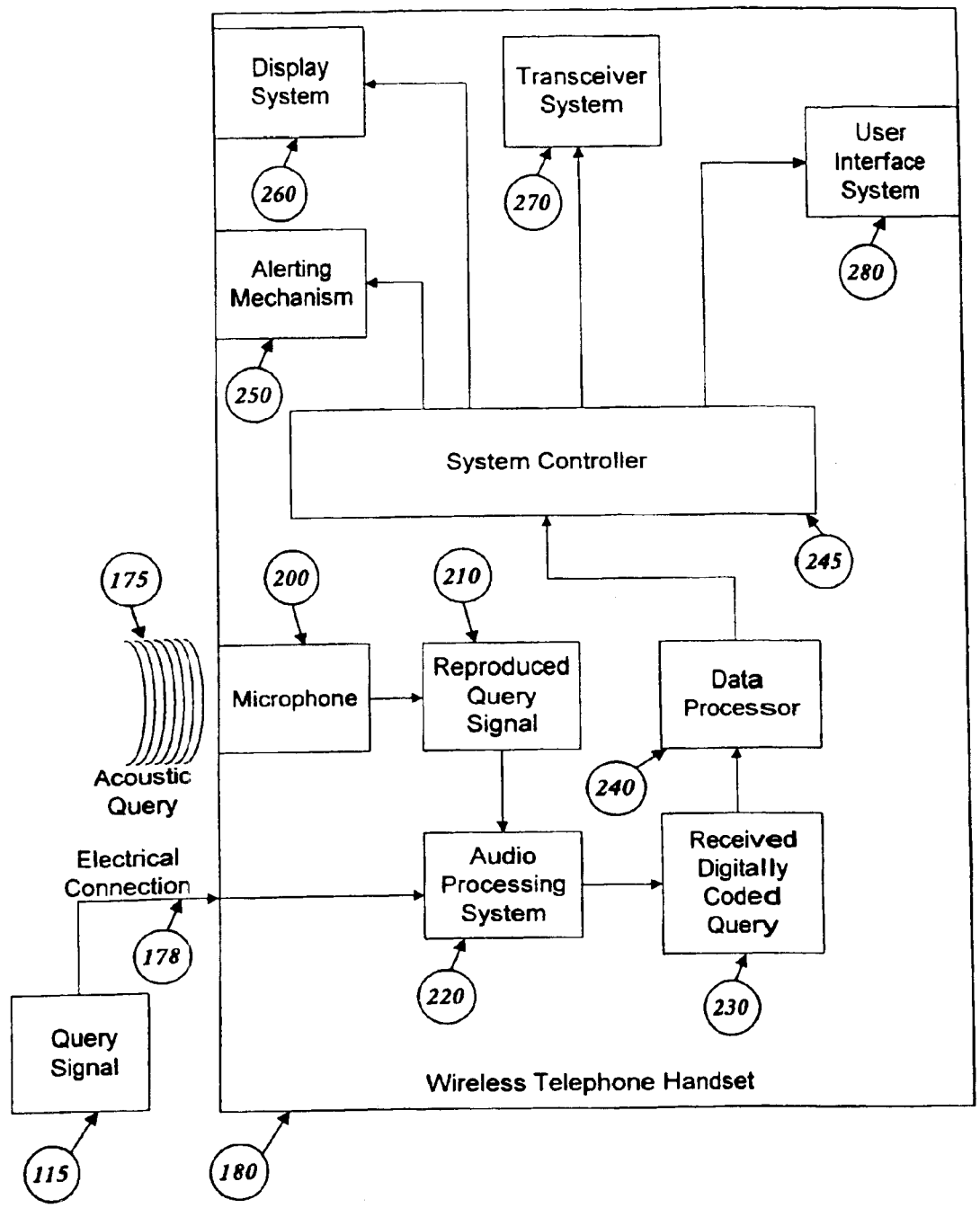
FIG. 6 is a schematic block diagram of a Wireless Telephone Handset used in the preferred embodiment of the invention.

When a specially enabled Wireless Telephone Handset 180, such as the one shown in FIG. 6, is in nearby proximity to the Broadcast Receiver 170, and is operating in idle mode, it will receive the acoustic reproduction 177 from the Broadcast Receiver at its microphone. In accordance with the operations shown in FIG. 6, the Wireless Telephone Handset 180 will then detect the embedded Acoustic Query 175 so as to reproduce the original Query Signal, will decode the Query Signal so as to reproduce the original Digitally Coded Query, and will then configure itself according to the coded instructions therein. The Wireless Telephone Handset may also provide to the user some form of indication, such as the generation of a tone, to indicate receipt of the Digitally Coded Query. If the user subsequently manipulates the Wireless Telephone Handset 180 in a manner as prescribed by the Digitally Coded Query, the Wireless Telephone Handset will then transmit a Response Message 183 as shown in FIG. 3, also as prescribed by the Digitally Coded Query as corresponding to the particular action taken by the user. Alternatively, when instructed by the content of the Digitally Coded Query, and as a second system of the invention, the Wireless Telephone Handset may automatically transmit a prescribed Response Message without the need for any specific action on the part of the human user.

Protocols and formats available for transmission of uplink digital messages within a wireless network will vary from network to network, and it can be readily understood that a particular Wireless Telephone Handset will use those formats and protocols that are compatible with the Serving Wireless Network when transmitting a Response Message. In the preferred embodiment of the invention, standard uplink short message protocols are used.

Depending upon the protocols used, the Response Message may include "header" and/or "content" fields. Within these fields, the following data will be included: The unique identification of the Wireless Telephone Handset sending the message (typically a Mobile Identification Number or International Mobile Station Identity); the IP Address from the Digitally Coded Query; the ID Code from the Digitally Coded Query; and a Response Code, which indicates which of the possible user actions, if any, precipitated the transmission of the Response Message.

The Response Message from the Wireless Telephone Handset 180 is received and processed by the Serving Wireless Network 185 using conventional means well known to those skilled in the art. Associated with the wireless network is a Short Message Processing System 187 which includes functionality that enables it to route uplink short messages. Means for realization of such a Short Message Processing System are well known to those skilled in the art.

The Short Message Processing System 187 routes uplink short messages through the Internet 190 to the Interactive Message Processor 192 using conventional Internet protocols. The Interactive Message Processor is a computer system programmed so as to process Response Messages. Such processing includes, but is not limited to, correlation between the ID Code in a Response Message and the corresponding Digitally Coded Query and correlation between the Response Code in a Response Message and the corresponding Prompt Code from the corresponding Digitally Coded Query. The Interactive Message Processor could also typically have means for correlating the unique identity of the Wireless Telephone Handset with pre-programmed user information, such as name, address, telephone number, e-mail address, and credit card number, for facilitating completion of desired transactions. Means for providing such functionality is well known to those skilled in the art. One can readily appreciate that messages could alternatively be conveyed between the Short Message Processing System 187 and the Interactive Message Processor 192 by dedicated communications links, or that alternatively the Short Message Processing System 187 and the Interactive Message Processor 192 could be co-located or could reside as different software functions within the same computer system.

In some applications of the invention, further data communication between the Wireless Telephone Handset 180 and the Interactive Message Processor 192, beyond the initial Response Message, may be either required or useful. Such data communication, routed through the Internet 190, the Short Message Processing System 187, and the Serving Wireless Network 185, may be conducted using standard means well known to those skilled in the art.

As an alternative to the transmission of a digital Response Message, and as the third system of the invention, the Digitally Coded Query may instruct that a particular user action result in the Wireless Telephone Handset initiating a call to the Response Telephone Number coded within the Digitally Coded Query, using conventional call initiation protocols appropriate to the serving wireless network 185. In this case the wireless network 185 will, through standard means well known to those skilled in the art, route the call appropriately through the public switched telephone network ("PSTN") 188.

Figure 4:
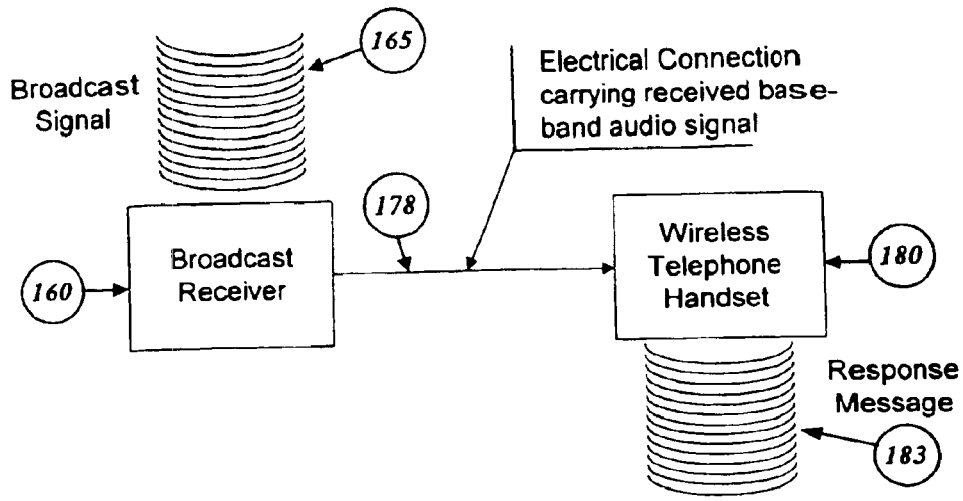
FIG. 4 is a schematic block diagram of the portions of the fourth system of the invention which differ from the first system.

FIG. 4 shows how the fourth system according to the present invention differs from the first, second, and third systems illustrated in FIG. 3. In this fourth system the Broadcast Receiver 160 is connected to the Wireless Telephone Handset 180 by an electrical connection 178. The electrical connection carries the base-band audio channel received by the Broadcast Receiver, including any embedded Query Signals. The Wireless Telephone Handset then decodes the Query Signal as in the first system.

Figure 5:
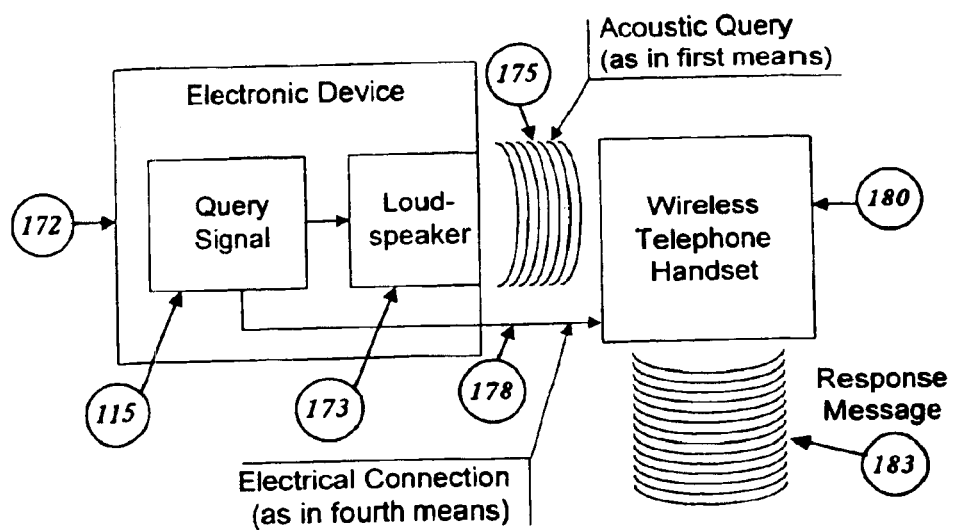
FIG. 5 is a schematic block diagram of the portions of the fifth system of the invention which differ from the first system.

FIG. 5 shows how the fifth system according to the present invention differs from the first, second, and third system illustrated in FIG. 3. In this fifth system an Electronic Device 172 includes circuitry, the design of which is well known to those skilled in the art, which creates a Query Signal 115, and also includes means, such as a loudspeaker 173, by which the Query Signal is converted to an Acoustic Query 175. In addition to this functionality, the Electronic Device may include other functionality which is unrelated to the invention except that its operation is enabled or enhanced by application of the invention. A Wireless Telephone Handset 180 may receive the Acoustic Query 175 as in the first system or may receive the Query Signal 115 from an electronic device 172 through an electrical connection 178 as in the fourth system.

The invention requires the use of a specially enabled wireless device. While a number of different types of wireless devices with a number of different internal designs may be utilized, the preferred embodiment of the invention utilizes a Wireless Telephone Handset 180 configured as shown in FIG. 6.

In the normal operation of the wireless Telephone Handset 180, the microphone 200 converts acoustic signals to base-band audio signals. By that functionality it converts the Acoustic Query 175 to a Reproduced Query Signal 210. Alternatively, a Query Signal 115 produced by a broadcast receiver or other electronic device may be conveyed to the Wireless Telephone Handset by an electrical connection 178. The Query Signal or Reproduced Query Signal is input to the Audio Processing System 220 which converts the Query Signal or Reproduced Query Signal into a Received Digitally Coded Query 230, which is input to the Data Processor 240.

Using algorithms and processes well known to those skilled in the art, the Data Processor 240 decodes the data content bits of each Data Word of the Received Digitally Coded Query 230. Under ideal circumstances, the Received Digitally Coded Query 230 is the same, bit for bit, as the original Digitally Coded Query 100. However, because of noise or other impairment in the various processes and transmission channels involved, some of the bits in the Received Digitally Coded Query 230 may be in error. While the coding scheme used for each Data Word of the Digitally Coded Query 100 allows for up to two bit errors within the word to be detected and corrected. In the preferred embodiment of the invention error correction is limited to one bit error per word so as to minimize the possibility of undetected errors. Error correction and detection is further enhanced by comparison and/or combination of the five repeats of each Data Word within the Received Digitally Coded Query 230. Methods useful for realizing this error detection and correction are well known to those skilled in the art. If the Data Processor is able to successfully recover each of the four Data Words of the Received Digitally Coded Query 230 without uncorrectable errors, it forwards the content data of each Data Word (with correction of correctable bit errors) to the System Controller 245.

In the preferred embodiment of the present invention, the System Controller 245 of the Mobile Telephone Handset 180 is a digital microcontroller, which controls the general operation of the various sub-systems within the Mobile Telephone handset. Upon receiving the content data from the four Data Words of the Received Digitally Coded Query 230, the System Controller 245 configures the various subsystems of the Mobile Telephone Handset 180 so as to perform the following functions.

The Alerting Mechanism 250 includes a speaker for generating an aural signal to alert the user to the successful receipt of a Digitally Coded Query 230.

The Display System 260 displays prompts according to instructions received within the Received Digitally Coded Query 230.

In the second system according to the present invention, the Transceiver System 270 will, without further user action, transmit the prescribed Response Message using formats and protocols appropriate for the wireless system in use.

In the first, fourth, and fifth systems of the invention, if the user takes an appropriate action, which typically takes the form of pressing one or more buttons or "keys" in the User Interface System 280, the Transceiver System 270 transmits the prescribed Response Message using formats and protocols appropriate for the wireless system in use.

In the third system of the invention the Wireless Telephone Handset 180 will operate in normal fashion to initiate a telephone call to the prescribed telephone number.

In applications of the invention involving further data communication between the Wireless Telephone Handset 180 and the Interactive Message Processor 192 beyond the initial Response Message, the Wireless Telephone handset 180 will operate in a conventional manner so as to facilitate such further data communications.

The function of the preferred embodiment of the present invention, as shown in FIGS. 1, 2, 3, and 6 is illustrated by the following description of a practical application.

A commercial enterprise or consortium of commercial enterprises operating the Interactive Message Processor 192 of FIG. 3 solicits users of compatible Wireless Telephone Handsets 180 to register for interactive services. This registration includes the users providing various information. For purposes of the present example, this information includes the unique mobile identification number (MIN) of the user's Wireless Telephone Handset and the user's designated e-mail address.

A resort hotel, for example, wishes to advertise its property using radio broadcast advertisements with interactive capabilities according to the invention. It determines that it would like to enable two possible interactive responses to such advertisements. The first possible response will be the transmission of a Response Message that will lead to the delivery of an e-mail to the respondent's e-mail address, and second possible response will be the placement of a telephone call to the hotel's reservations center allowing a respondent to immediately make or inquire about room reservations.

In order to facilitate the first possible response, the hotel will arrange with the operator of the Interactive Message Processor to send a particular e-mail message to the designated e-mail address for each registered respondent to its interactive advertisements.

The operator of the Interactive Message Processor provides to the hotel a unique 16-bit ID code 10 in FIG. 1*a* as well as the appropriate IP address 5 for inclusion within the Digitally Coded Query 100 of FIG. 2 that will be included within the hotel's broadcast advertisements.

The hotel then completes the formation of the Digitally Coded Query 100. The Prompt Codes 20 in FIG. 1*a* are filled as follows: PC0 is set to the pre-determined value indicating the display of "CALL", PC1 is set to the pre-determined value indicating the display of "E-MAIL INFO", PC2 through PC5 are set to zero (000000 binary) since only two possible responses are to be defined for this particular Digitally Coded Query, and the telephone number of the hotel's reservation center is entered into the Telephone Number fields 30.

Using the fully defined Digitally Coded Query 100, and using the mechanism depicted in FIG. 2, the hotel produces a Query Signal 115, which it may conveniently record for later transmission using any one of several conventional means.

The hotel then contracts with various radio broadcasters to air its advertisements. These advertisements, which may either be pre-recorded or "live", will consist of an audio "Content" 145 typically including an announcer's voice, and the Query Signal 115, as shown in FIG. 3. The Query Signal 115 is combined with the audio Content by inserting it at the desired point in the advertisement using the Audio Combiner 150 of FIG. 3. In the case of a pre-recorded advertisement, the output of the Audio Combiner 150 is recorded for later transmission using any one of several conventional means.

It is generally useful, but not required, that the timing of the Query Signal insertion coincide with a portion of the audio Content wherein instructions for responses are provided. In the present example, the Query Signal might be inserted immediately before an announcer says "Press '0' 'SEND' to have a brochure e-mailed to you or '1' 'SEND' to be connected directly to our reservations desk."

As shown in FIG. 3, the advertisement for the hotel output from the Audio Combiner 150 and including the Query Signal 115, is broadcast by the Broadcast Transmitter 155 as part of the radio station's Broadcast Signal 165. A Broadcast Receiver 160 that happens to be tuned to that radio station's frequency and is receiving a signal of sufficient strength will then reproduce the hotel advertisement as part of its acoustic reproduction of the broadcast audio channel 177, typically from a loudspeaker. This reproduction will include the Acoustic Query 175, which is nothing more than the acoustic representation of the original Query Signal 115.

When a compatible Wireless Telephone Handset 180 as depicted in FIG. 6, which is powered "on" but is not engaged in a call or in processing of a call (i.e. "idle"), is positioned so that its microphone 200 receives the Acoustic Query 175 embedded in the acoustic reproduction 177, the microphone's output consisting of an electronic representation of incident acoustic signals will include the Reproduced Query Signal 210.

Using digital and/or analog audio processing techniques well known to experts in the field, the Wireless Telephone Handset's Audio Processing System 220 will detect the reception of a Reproduced Query Signal 210 and process it so as to extract a data sequence in the form of the Received Digitally Coded Query 230, which will be nominally identical to the four data word sequence in the original Digitally Coded Query 100. However, due to noise in the broadcast channel or acoustic noise incident to the Microphone 200, and/or due to processing imperfections, the Received Digitally Coded Query 230 may include one or more bit errors. Using digital processing techniques well known to experts in the field, the Wireless Telephone Handset's Data Processor 240 will identify, and if possible correct, such data errors. If the Received Digitally Coded Query 230 is received without detectable errors or if the Data Processor is able to correct all detected errors, then the correct data sequence will be passed to the Wireless Telephone Handset's System Controller 245 which typically consists of a digital microprocessor or microcomputer.

When the System Controller 245 receives a correct data sequence from the Data Processor 240, it will act upon it according to the data content and according to pre-programmed conventions. In the present example, wherein the Received Digitally Coded Query originated from the hotel advertisement, the System Controller 245 will typically cause the Display System 260 to display the prompts as defined in the PC0 and PC1 fields of the Digitally Coded Query 100. By this means, the display might then appear as follows.

RESPONSES

0=CALL

1=E-MAIL INFO

The System Controller 245 will configure itself so that when the user subsequently enters the sequence '0' 'SEND' or its equivalent on the User Interface System 280 the Wireless Telephone Handset will initiate a telephone call using normal processes compatible with the wireless system in use to the telephone number encoded in the Telephone Number field of the Digitally Coded Query 100.

The System Controller 245 will further configure itself so that when the user subsequently enters the sequence '1' 'SEND' or its equivalent on the User Interface System 280 the Wireless Telephone Handset will initiate transmission of a Response Message 183. The Response Message will be a standard short digital message, using normal processes compatible with the wireless system in use, in a predetermined format that includes: the Internet Protocol Address and ID Code encoded in the Digitally Coded Query 100, the MIN of the Wireless Telephone Handset 180, and a code that indicates that the user initiated the response by pressing the '1' key on the User Interface System 280.

Finally, the System Controller 245 will typically cause a unique aural signal to be generated by the Alerting Mechanism 250 so as to indicate to the user that a Digitally Coded Query has been successfully received and processed by the Wireless Telephone Handset 180.

In the present example wherein the Received Digitally Coded Query originated from the hotel advertisement, let us assume that the user of the Wireless Telephone Handset 180 has previously registered with the operator of the Interactive Message Processor 192 as described above. Let us further assume that the user, while listening to the radio broadcast being received by the Broadcast Receiver 160, hears the advertisement for the hotel. Upon hearing the distinctive sound of the Query Signal within the advertisement, and upon also hearing the distinctive aural signal from the Wireless Telephone Handset's Alerting Mechanism 250, the user recognizes that an interactive response to the advertisement is available.

The user is further instructed by the information provided by the announcer in the advertisement content and by the prompts on the Display System 260 of the Wireless Telephone Handset 160. Let us now assume that the user wishes to receive an e-mail with more information about the hotel. Guided by the announcer's instructions and/or the prompts on the Wireless Telephone Handset display, the user then will enter the key sequence '1' 'SEND' on the keypad of the User Interface System 280 of the Wireless Telephone Handset 180.

As suggested above, this user action will cause the Wireless Telephone Handset to send a Response Message 183 in the form of a short digital message with format and content as described above. Assuming proper compatibility of the Wireless Telephone Handset 180 and the Serving Wireless Network 185 this will cause the content of the Response Message to be conveyed to the Short Message Processing System 187. By conventional means well known to experts in the field, the Short Message Processing System will have been programmed to forward such Response Message content via the Internet 190 to the Interactive Message Processor 192.

Based upon pre-arranged agreements between the hotel and the operator of the Interactive Message Processor, the data contained in the Response Message and the data provided by the user upon his/her previous registration, the Interactive Message Processor 192 will cause the appropriate e-mail message to be sent to the user's e-mail address. The programming required to provide this correlative and executive functionality of the Interactive Message Processor is well known to experts in the field.

It should be apparent that although a preferred embodiment of the invention is described above, numerous modifications or alternative embodiments are possible. All such modifications or alternative embodiments are intended to be included within the scope of the appended claims.

What is claimed is:

1. A method for performing a wireless interactive transaction using a wireless telephone handset comprising the steps of:
    forming a digitally coded query signal which is separate from an audio-band content to be broadcast;
    converting said digitally coded query signal into an audio-band query signal;
    injecting said audio-band query signal into said audio-band content to produce a combined audio-band signal;
    transmitting said combined audio-band signal on an audio channel;
    receiving said combined audio-band signal from said audio channel by a device which is separate from the wireless telephone handset;
    conveying said received combined audio-band signal from said separate device to said wireless telephone handset;
    processing said combined audio-band signal conveyed from said separate device at the wireless telephone handset to reproduce the digitally coded query signal and to decode instructions coded therein when forming said digitally coded query signal; and
    controlling said wireless telephone handset to respond to said decoded instructions.

2. The method for performing a wireless interactive transaction according to claim 1, wherein said decoded instructions include a response telephone number and said step of controlling controls said wireless telephone handset to initiate a telephone call to said response telephone number.

3. The method for performing a wireless interactive transaction according to claim 1, wherein said step of controlling controls said wireless telephone handset to respond to said decoded instructions after a predetermined action by a user.

4. The method for performing a wireless interactive transaction according to claim 3, wherein said decoded instructions include user instructions, and said step of controlling controls said wireless telephone handset to display said user instructions and to respond to said decoded instructions when said user responds to said displayed user instructions.

5. The method for performing a wireless interactive transaction according to claim 1, wherein an alerting signal is produced when said combined audio-band signal is conveyed to said wireless telephone handset.

6. The method for performing a wireless interactive transaction according to claim 1, wherein said decoded instructions include instructions to send a pre-determined digital message to a particular destination and said step of controlling controls said wireless telephone handset to send said digital message.

7. The method for performing a wireless interactive transaction according to claim 1, wherein said conveying of said combined audio-band signal to said wireless telephone handset is comprised of the steps of:
    producing an acoustic query signal from said received combined audio-band signal; and
    detecting and converting to an audio-band signal said acoustic query signal by said wireless telephone handset.

8. The method for performing a wireless interactive transaction according to claim 1, wherein said conveying of said combined audio-band signal to said wireless telephone handset is by an electronic connection.

9. A method for performing a wireless interactive transaction using a wireless telephone handset comprising the steps of:
    forming a digitally coded query signal of predetermined length and format and converting said digitally coded query signal into an audio-band query signal by an electronic device;
    conveying said audio-band query signal to said wireless telephone handset;
    processing said audio-band query signal to decode instructions coded in the digitally coded query signal when forming said digitally coded query signal; and
    controlling said wireless telephone handset to respond to said decoded instructions.

10. The method for performing a wireless interactive transaction according to claim 9, wherein said decoded instructions include a response telephone number and said step of controlling controls said wireless telephone handset to initiate a telephone call to said response telephone number.

11. The method for performing a wireless interactive transaction according to claim 9, wherein said step of controlling controls said wireless telephone handset to respond to said decoded instructions after a predetermined action by a user.

12. The method for performing a wireless interactive transaction according to claim 11, wherein said decoded instructions include user instructions, and said step of controlling controls said wireless telephone handset to display said user instructions and to respond to said decoded instructions when said user responds to said displayed user instructions.

13. The method for performing a wireless interactive transaction according to claim 9, wherein an alerting signal is produced when said audio-band query signal is conveyed to said wireless telephone handset.

14. The method for performing a wireless interactive transaction according to claim 9, wherein said decoded instructions include instructions to send a pre-determined digital message to a particular destination and said step of controlling controls said wireless telephone handset to send said digital message.

15. The method for performing a wireless interactive transaction according to claim 9, wherein said conveying of said audio-band query signal to said wireless telephone handset is comprised of the steps of:
producing an acoustic query signal from said audio-band query signal; and
detecting and converting to an audio-band signal said acoustic query signal by said wireless telephone handset.

16. The method for performing a wireless interactive transaction according to claim 9, wherein said conveying of said audio-band query signal to said wireless telephone handset is by an electronic connection.

17. A system for performing a wireless interactive transaction using a wireless telephone handset, comprising:
an interface for forming a digitally coded query signal which is separate from an audio-band content to be broadcast and converting said digitally coded query signal into an audio-band query signal;
a subsystem for injecting said audio-band query signal into said audio-band content to produce a combined audio-band signal;
a transmitter for transmitting said combined audio-band signal on an audio channel;
a receiver for receiving said combined audio-band signal from said audio channel by a device which is separate from the wireless telephone handset;
a device for conveying said received combined audio-band signal from said separate device to said wireless telephone handset; and
a microcomputer included in said wireless telephone handset for processing said combined audio-band signal conveyed from said separate device to reproduce the digitally coded query signal and to decode instructions coded therein when forming said digitally coded query signal and for controlling said wireless telephone handset to respond to said decoded instructions.

18. The system for performing a wireless interactive transaction according to claim 17, wherein said decoded instructions include a response telephone number and said microcomputer controls said wireless telephone handset to initiate a telephone call to said response telephone number.

19. The system for performing a wireless interactive transaction according to claim 17, wherein said microcomputer controls said wireless telephone handset to respond to said decoded instructions after a predetermined action by a user.

20. The system for performing a wireless interactive transaction according to claim 19, wherein said decoded instructions include user instructions, and said microcomputer controls said wireless telephone handset to display said user instructions and to respond to said decoded instructions when said user responds to said displayed user instructions.

21. The system for performing a wireless interactive transaction according to claim 17, wherein an alerting signal is produced when said combined audio-band query signal is conveyed to said wireless telephone handset.

22. The system for performing a wireless interactive transaction according to claim 17, wherein said decoded instructions include instructions to send a pre-determined digital message to a particular destination and said microcomputer controls said wireless telephone handset to send said digital message.

23. The system for performing a wireless interactive transaction according to claim 17, wherein said device for conveying said combined audio-band query signal to said wireless telephone handset produces an acoustic query signal from said received combined audio-band query signal, and said wireless telephone handset detects and converts to an audio-band signal said acoustic query signal.

24. The system for performing a wireless interactive transaction according to claim 17, wherein said device for conveying said combined audio-band signal to said wireless telephone handset is an electronic connection.

25. A system for performing a wireless interactive transaction using a wireless telephone handset, comprising:
an interface for forming a digitally coded query signal of predetermined length and format and converting said digitally coded query signal into an audio-band query signal;
a device for conveying said audio-band query signal to said wireless telephone handset; and
a microcomputer included in said wireless telephone handset for processing said audio-band query signal to decode instructions coded in the digitally coded query signal when forming said digitally coded query signal and for controlling said wireless telephone handset to respond to said decoded instructions.

26. The system for performing a wireless interactive transaction according to claim 25, wherein said decoded instructions include a response telephone number and said microcomputer controls said wireless telephone handset to initiate a telephone call to said response telephone number.

27. The system for performing a wireless interactive transaction according to claim 25, wherein said microcomputer controls said wireless telephone handset to respond to said decoded instructions after a predetermined action by a user.

28. The system for performing a wireless interactive transaction according to claim 27, wherein said decoded instructions include user instructions, and said microcomputer controls said wireless telephone handset to display said user instructions and to respond to said decoded instructions when said user responds to said displayed user instructions.

29. The system for performing a wireless interactive transaction according to claim 25, wherein an alerting signal is produced when said audio-band query signal is conveyed to said wireless telephone handset.

30. The system for performing a wireless interactive transaction according to claim 25, wherein said decoded instructions include instructions to send a pre-determined digital message to a particular destination and said microcomputer controls said wireless telephone handset to send said digital message.

31. The system for performing a wireless interactive transaction according to claim 25, wherein said device for conveying said audio-band query signal to said wireless telephone handset produces an acoustic query signal from said audio-band query signal and said wireless telephone handset detects and converts to an audio-band signal said acoustic query signal.

32. The system for performing a wireless interactive transaction according to claim 25, wherein said device for conveying said audio-band query signal to said wireless telephone handset is an electronic connection.

* * * * *